United States Patent
Osaki

(10) Patent No.: US 9,036,166 B2
(45) Date of Patent: May 19, 2015

(54) MEDIUM PROCESSING APPARATUS, IMAGE FORMATION APPARATUS, AND MEDIUM DISCHARGE MECHANISM TO PREVENT A MEDIUM FROM BEING JAMMED

(71) Applicant: Oki Data Corporation, Tokyo (JP)

(72) Inventor: Koji Osaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/310,268

(22) Filed: Jun. 20, 2014

(65) Prior Publication Data

US 2015/0002869 A1    Jan. 1, 2015

(30) Foreign Application Priority Data

Jun. 27, 2013  (JP) .................................. 2013-134679

(51) Int. Cl.
*G06K 15/00*  (2006.01)
*B65G 57/00*  (2006.01)
*G06K 15/16*  (2006.01)

(52) U.S. Cl.
CPC ................ *B65G 57/00* (2013.01); *G06K 15/16* (2013.01); *G06K 15/403* (2013.01)

(58) Field of Classification Search
USPC .................................. 358/1.12; 271/110, 279
See application file for complete search history.

(56) References Cited

U.S. PATENT DOCUMENTS

2011/0049786 A1*  3/2011  Lee ................................ 271/110
2012/0248694 A1* 10/2012  Cheng ........................... 271/279

FOREIGN PATENT DOCUMENTS

JP    2008-019080 A    1/2008
JP    2010-159142 A    7/2010

OTHER PUBLICATIONS

Machine translation for JP 2008-019080, IDS, Jan. 2008.*
Machine translation for JP 2010-159142, IDS, Jul. 2010.*

* cited by examiner

*Primary Examiner* — Qian Yang
(74) *Attorney, Agent, or Firm* — Marvin A. Motsenbocker; MOTS LAW, PLLC

(57) ABSTRACT

An apparatus includes a discharge mechanism including a drive roller rotatable in a normal direction to discharge a medium and in a reverse direction reversed to the normal direction, and a driven roller in contact with the drive roller and configured to be rotated by the rotation of the drive roller. The apparatus also includes a stacker on which the medium discharged from the discharge mechanism is to be stacked. The driven roller is movable in position depending on the rotation of the drive roller in the normal direction or the reverse direction, such that the driven roller is located at a first position in the vicinity of the stacker when the drive roller is rotating in the normal direction, and the driven roller is located at a second position further away from the stacker than the first position when the drive roller is rotating in the reverse direction.

17 Claims, 12 Drawing Sheets

MEDIUM PROCESSING APPARATUS, IMAGE FORMATION APPARATUS, AND MEDIUM DISCHARGE MECHANISM TO PREVENT A MEDIUM FROM BEING JAMMED

CROSS REFERENCE TO RELATED APPLICATIONS

This application claims priority based on 35 USC 119 from prior Japanese Patent Application No. 2013-134679 filed on Jun. 27, 2013, entitled "MEDIUM PROCESSING APPARATUS, IMAGE FORMATION APPARATUS, AND MEDIUM DISCHARGE MECHANISM", the entire contents of which are incorporated herein by reference.

BACKGROUND OF THE INVENTION

1. Field of the Invention

This disclosure relates to a medium processing apparatus that performs a predetermined process on a medium, such as an image formation apparatus that forms an image on a medium. This disclosure also relates to a medium discharge mechanism that discharges a medium.

2. Description of Related Art

In image formation apparatuses such as printers or copiers, regist rollers convey a medium (paper) fed from a paper feed tray to an image formation unit, and the image formation unit transfers a toner image onto the medium. Further, a fixation unit fixes the toner image to the medium, and then discharge rollers discharge the medium to a discharged paper tray.

In duplex printing of the image formation apparatus thus configured, the discharge rollers are rotated in the reverse direction when the discharge rollers discharge the medium halfway; the medium is switched back along a predetermined re-conveyance path (conveyance path for the duplex printing), and the medium with front and back sides thereof reversed is sent to the regist rollers. The regist rollers again convey the medium to the image formation unit, and the image formation unit transfers a toner image onto the back side of the medium. Further, the fixation unit fixes the toner image to the medium, and the discharge rollers discharge the medium to the discharged paper tray (see, for example, Japanese Patent Application Publication No. 2008-19080 (see paragraphs 0035 and 0036, FIG. 1) and Japanese Patent Application Publication No. 2010-159142 (see paragraphs 0041 to 0043, FIG. 1)).

SUMMARY OF THE INVENTION

However, the conventional configuration has a possibility that the trailing ends of stacked media may come into contact with the discharge roller when a large number of media are stacked on the discharged paper tray. Accordingly, when the discharge rollers rotate in the reverse direction as in the manner mentioned above, the media stacked on the discharged paper tray may be drawn in by the discharge rollers and jammed.

An objective according to one embodiment of the invention is to prevent a medium from being jammed.

An aspect of the invention is an apparatus that includes: a discharge mechanism including a drive roller rotatable in a normal direction to discharge a medium and in a reverse direction reversed to the normal direction, and a driven roller in contact with the drive roller and configured to be rotated by the rotation of the drive roller; and a stacker on which the medium discharged from the discharge mechanism is to be stacked. The driven roller is movable depending on the rotation of the drive roller in the normal direction or the reverse direction, such that the driven roller is located at a first position in the vicinity of the stacker when the drive roller is rotating in the normal direction, and the driven roller is located at a second position further away from the stacker than the first position when the drive roller is rotating in the reverse direction.

According to the above aspect, when the drive roller rotates in the reverse direction, the driven roller is located at the retracted position. This prevents the media stacked on the stacker from being in contact with the driven roller. Thus, the media stacked on the stacker is prevented from being drawn into the discharge mechanism by the driven roller. With this, it is possible to prevent the media from being jammed.

DETAILED DESCRIPTION OF EMBODIMENTS

Figure 1:
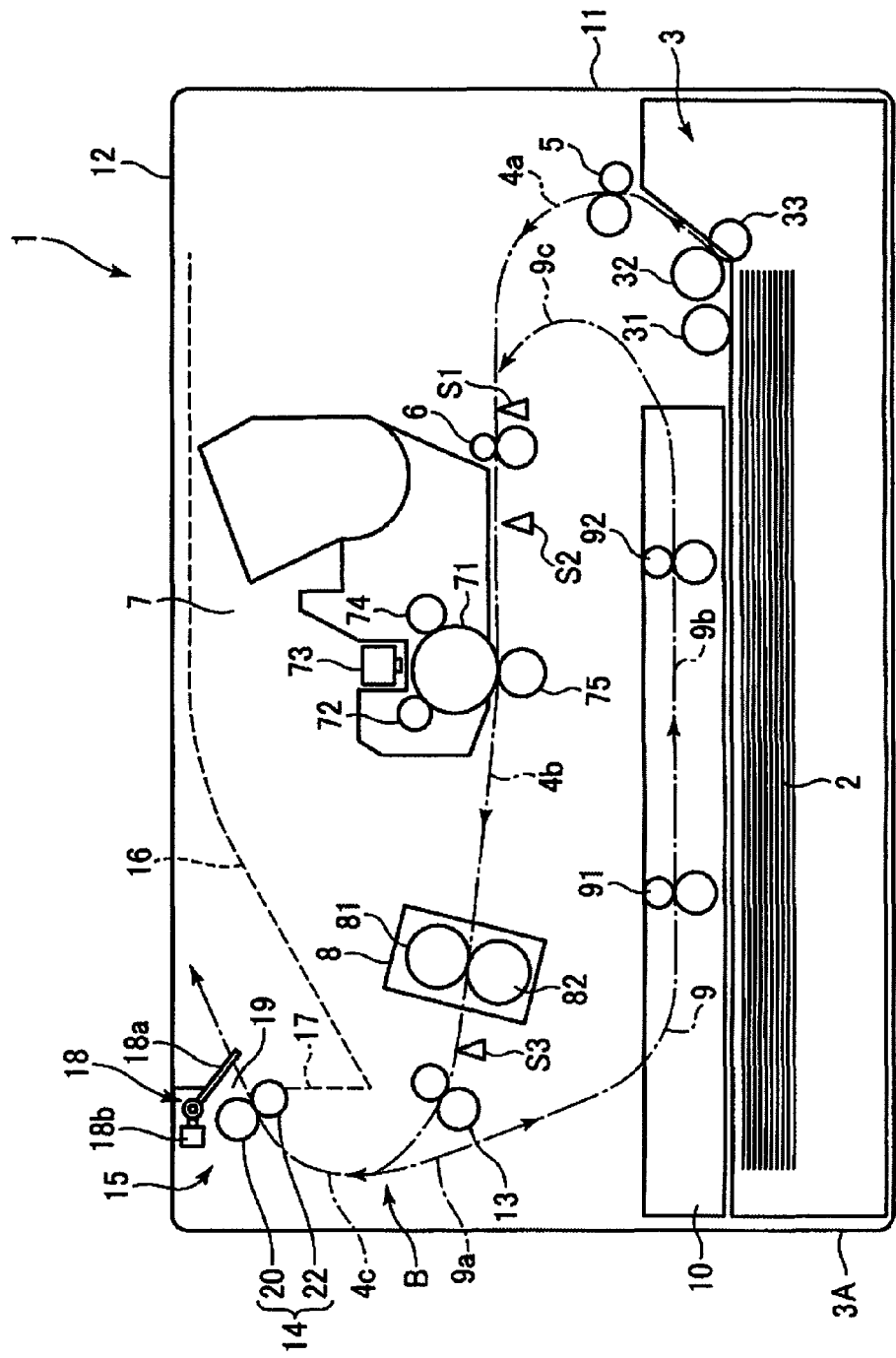
FIG. 1 is a view illustrating a basic configuration of a printer according to a first embodiment of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

Configuration of Printer

Printer 1 as an image formation apparatus (medium processing apparatus) according to a first embodiment of the invention is described. FIG. 1 is a view illustrating a basic configuration of printer 1. Printer 1 is provided with: paper feed unit (medium supply unit) 3 that stores therein media 2 such as sheets of printing paper, and paper-feeds media 2 one by one; image formation unit 7 that forms an image on medium 2 paper-fed from paper feed unit 3; fixation unit 8 that fixes the formed image onto medium 2; discharge mechanism (medium discharge mechanism) 15 that discharges medium 2 having the fixed image thereon; and housing 11 that stores therein these units. Top cover 12 that can open and close is provided at the upper side of housing 11.

Paper feed unit 3 is detachably installed in the lower portion of printer 1, and includes paper feed cassette 3A on which media 2 are stacked. Paper feed unit 3 is further provided with pickup roller 31 disposed at the upper side of paper feed cassette 3A, and paper feed roller 32 and retard roller 33 that are pairs of rollers disposed adjacent to pickup roller 31.

Pickup roller 31 is disposed so as to come into contact with the surface of medium 2 stacked on paper feed cassette 3A. Pickup roller 31 rotates to draw out media 2 one by one from paper feed cassette 3A. Paper feed roller 32 sends out medium 2 drawn out by pickup roller 31 in supply conveyance path 4a. Moreover, retard roller 33 includes a torque limiter therein, and separates media 2 one by one conveyed by paper feed roller 32.

Conveyance roller unit 5 and conveyance roller unit 6 are disposed along supply conveyance path 4a. Conveyance roller unit 5 further conveys medium 2 sent out by paper feed roller 32 in supply conveyance path 4a, along supply conveyance path 4a. Conveyance roller unit 6 is disposed near image formation unit 7, and conveys medium 2 conveyed from conveyance roller unit 5, to image formation unit 7.

Image formation unit 7 is provided with photosensitive drum 71 serving as an image carrier that is rotatable in one direction (in a clockwise direction in the drawing). Charge roller 72 serving as a charge member, recording head 73 serving as an exposure unit, development roller 74 serving as a developer carrier, and transfer roller 75 serving as a transfer member are disposed along the rotation direction of photosensitive drum 71. Medium 2 conveyed from conveyance roller unit 6 is conveyed by traveling in conveyance path (image formation conveyance path) 4b provided between photosensitive drum 71 and transfer roller 75.

Photosensitive drum 71 is an approximate cylindrical member that is provided with a photoconductive layer on a surface thereof. Charge roller 72 uniformly charges the surface of photosensitive drum 71. Recording head 73 includes an light-emitting diode (LED), for example, and irradiates the surface of photosensitive drum 71 with light to form an electrostatic latent image corresponding to image data. Development roller 74 holds toner (developer) on an outer circumferential surface thereof, and develops the electrostatic latent image on photosensitive drum 71. Transfer roller 75 transfers a toner image (developer image) on photosensitive drum 71 onto medium 2 having passed between photosensitive drum 71 and transfer roller 75.

Fixation unit 8 fixes the toner image transferred onto medium 2 by image formation unit 7, to medium 2. Fixation unit is provided with fixation roller (heat roller) 81, and pressurization roller 82 in pressure contact with fixation roller 81. Fixation roller 81 includes fixation heater 83 serving as a heat source therein. Fixation roller 81 and pressurization roller 82 apply heat and pressure to medium 2 in a nip part formed therebetween to cause the toner image to be fused and fixed to medium 2. Note that, image formation unit 7 and fixation unit 8 constitute a process unit that performs a predetermined process (herein, image formation) with respect to the medium.

Discharge mechanism 15 (medium discharge mechanism) conveys medium 2 to which the toner image is fixed in fixation unit 8 along conveyance path (discharge path) 4c, and discharges medium 2 to the outside of printer 1 through discharge port 19. Discharge mechanism 15 includes conveyance roller unit 13 that conveys medium 2 discharged from fixation unit 8 upward, and discharge roller unit 14 that discharges medium 2, conveyed from conveyance roller unit 13, to the outside of the printer 1 through discharge port 19. Discharge roller unit 14 includes discharge roller 20 (a drive roller) and pinch roller 22 (a driven roller).

Stacker 16 (discharged paper tray) is provided adjacent to discharge mechanism 15 to stack thereon media 2 discharged through discharge mechanism 15 from the printer 1. Herein, stacker 16 is formed on the upper surface of top cover 12 in printer 1.

Stacker full sensor 18 (stack detector) is provided in discharge mechanism 15 in order to detect the height of media 2a stacked on stacker 16. Stacker full sensor 18 is provided with lever unit 18a (movable body) attached to a part of top cover 12 in a swingable manner, and with sensor unit 18b (detector) that detects the angle of lever unit 18a.

Printer 1 in the embodiment is configured to allow duplex printing on medium 2. Accordingly, printer 1 is provided with re-conveyance path (conveyance path for duplex printing) 9 that guides medium 2 discharged from fixation unit 8 again to conveyance roller unit 6. Re-conveyance path 9 is branched from discharge path 4c, extends below fixation unit 8 and image formation unit 7, and is merged with supply conveyance path 4a at the upstream side of conveyance roller unit 6.

More specifically, re-conveyance path 9 includes introduction portion 9a, return portion 9b, and merge portion 9c. Medium 2 to which the toner image is fixed is sent into introduction portion 9a by a reverse rotation of discharge roller 20. Medium 2 sent to introduction portion 9a is conveyed along return portion 9b. Medium 2 conveyed along return portion 9b travels toward conveyance roller unit 6 through merge portion 9c.

Return portion 9b in re-conveyance path 9 is formed as an approximate horizontal conveyance path inside re-conveyance tray 10 detachably attached to printer 1. Pairs of re-conveyance rollers 91, 92 for conveying medium 2 along return portion 9b are provided in re-conveyance tray 10.

At a portion (branch part B) where introduction portion 9a in re-conveyance path 9 and discharge path 4c are connected to each other, film 26 (in FIG. 4, which is described later) is provided that serves as an elastic member that guides medium 2 to introduction portion 9a in re-conveyance path 9.

Printer 1 is configured in such a manner that, when a trailing end part of medium 2 conveyed along discharge path 4c passes by film 26, discharge roller 20 is rotated in the reverse direction to send medium 2 into re-conveyance path 9 (introduction portion 9a). Medium 2 sent into introduction portion 9a in re-conveyance path 9 is conveyed along return portion 9b by pairs of re-conveyance rollers 91, 92. Medium 2 passes through merge portion 9c, and reaches conveyance roller unit 6 in a state where front and back sides thereof are reversed. This allows the toner image to be formed on the back side of medium 2.

Passage sensors S1, S2 that detect the passage of medium 2 are respectively disposed at the upstream side and the downstream side of conveyance roller unit 6 in image formation conveyance path 4b (the conveyance path that passes through image formation unit 7 and fixation unit 8). Moreover, passage sensor S3 is disposed between fixation unit 8 and conveyance roller unit 13 in discharge path 4c (the conveyance path from fixation unit 8 to discharge mechanism 15).

Passage sensor S1 is used for determining a rotation start timing of conveyance roller unit 6. Passage sensor S2 is used for determining an exposure timing of recording head 73 in image formation unit 7. Passage sensor S3 is used for determining a timing when discharge roller 20 starts the rotation in the reverse direction for the duplex printing.

<Configuration of Discharge Mechanism>

Figure 2:
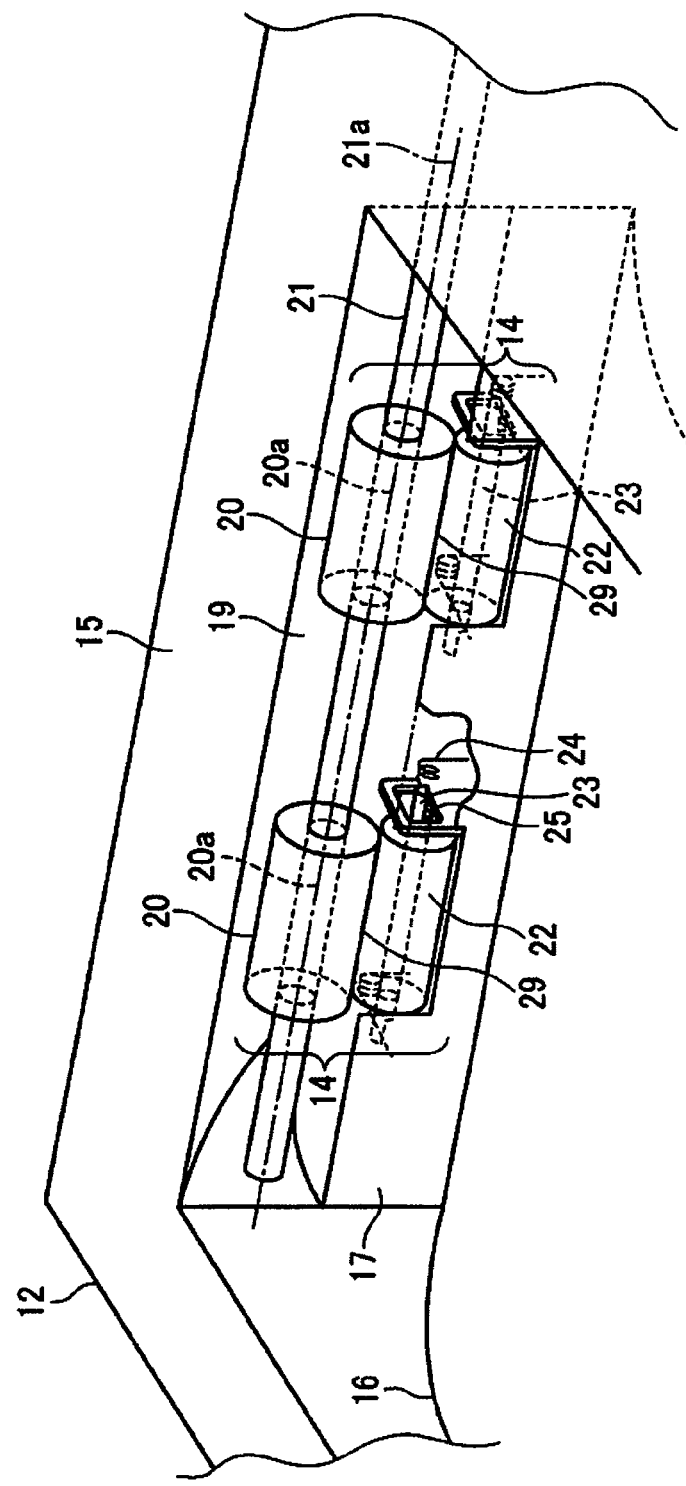
FIG. 2 is a perspective view illustrating a discharge mechanism of the printer in the first embodiment.

FIG. 2 is a perspective view of discharge mechanism 15 in the embodiment viewed from the side of stacker 16. Wall part 17 isolates discharge mechanism 15 from stacker 16. Discharge port 19 for discharging medium 2 is formed in wall part 17. Herein, wall part 17 is formed as a part of top cover 12 of printer 1.

Stacker 16 has a slanted bottom surface, and as a result of which, the height of the stacker increases as it becomes further apart from wall part 17. Accordingly, medium 2 discharged through discharge port 19 is stacked while sliding toward the side of wall part 17. In other words, media 2 are aligned and stacked in such a manner that the trailing ends thereof can come into contact with wall part 17.

Discharge roller unit 14, that discharges medium 2 through discharge port 19 to stacker 16, is disposed near discharge port 19. Discharge rollers 14 include discharge roller 20 serving as a drive roller and pinch roller 22 serving as a driven roller. Discharge roller 20 is disposed at the upper side, while pinch roller 22 is disposed at the lower side. Discharge roller 20 and pinch roller 22 are rotatably supported around a rotation shaft in the width direction of medium 2 (in other words, the width direction of discharge path 4c).

Discharge roller 20 is a cylindrical member that includes a material having a high friction coefficient, for example, a material having a friction coefficient of $\mu=3$. Discharge roller 20 is fixed to rotation drive shaft 21, and rotates together with rotation drive shaft 21. Rotation center 20a of discharge roller 20 agrees with rotation center 21a of rotation drive shaft 21.

A driving force from discharge motor 123, which is described later, is transmitted to one end of rotation drive shaft 21. Rotation drive shaft 21 rotates by the driving force from discharge motor 123, and discharge roller 20 also rotates together with rotation drive shaft 21. Note that, although two discharge rollers 20 are attached to rotation drive shaft 21 in the example illustrated in FIG. 2, the number of discharge rollers 20 is not limited to two. Alternatively, the number of discharge rollers 20 may be one or three or more.

Pinch roller 22 is a cylindrical member that includes a material having a lower friction coefficient than that of discharge roller 20, for example, a material having a friction coefficient of $\mu=0.3$. Pinch roller 22 is rotatably attached to the outer circumference of support shaft 23. Support shaft 23 is a shaft made of a metal, for example. The rotation center of pinch roller 22 agrees with the shaft center of support shaft 23.

Pinch roller 22 is brought into pressure contact with discharge roller 20 by a biasing force of spring 24, which is described later, and forms nip part 29 between pinch roller 22 and discharge roller 20. Herein, two pinch rollers 22 are provided so as to be opposed to discharge rollers 20. Note that, the number of pinch rollers 22 is not limited to two, but is determined in accordance with the number of discharge rollers 20.

Figure 3:
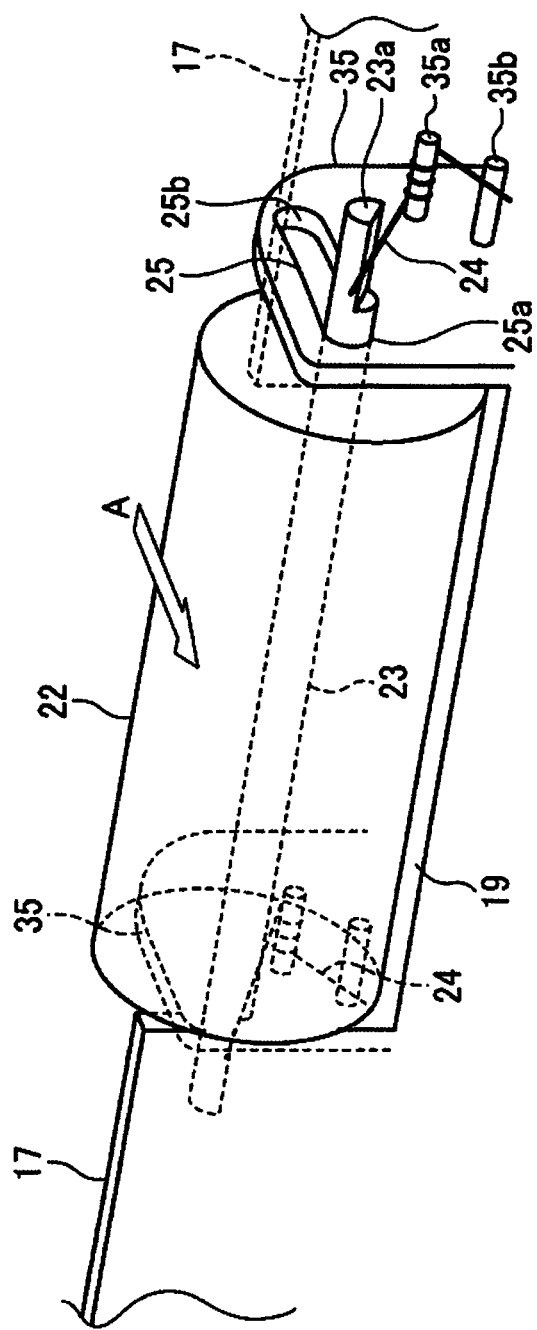
FIG. 3 is a perspective view illustrating a pinch roller in the first embodiment and a support portion thereof.

FIG. 3 is a perspective view illustrating pinch roller 22 and a support portion thereof by being enlarged. Support plates 35 serving as a support member are formed so as to be positioned at both sides in the shaft direction of pinch roller 22. Support plates 35 are formed as parts of top cover 12, for example.

Guide grooves 25 (guide units) into which both end parts of support shaft 23 are inserted are formed in respective support plates 35. Each guide groove 25 is widened in the tangential direction of discharge roller 20 in nip part 29. Guide grooves 25 restrict a movement range of support shaft 23 in the tangential direction of discharge roller 20 in nip part 29 (in other words, the discharge direction and the switchback direction of medium 2).

As for both end parts of guide groove 25 in the longitudinal direction, an end part in the discharge direction of medium 2 (the direction indicated by arrow A) is referred to as "outer-side end part 25a", and the other end part in the opposite direction is referred to as "inner-side end part 25b".

Note that, although guide groove 25 has an approximate circular arc shape in FIG. 3, the shape of guide groove 25 is not limited thereto. Guide groove 25 may have any shape such as an approximate rectangular shape, for example, as long as the shape can restrict the movement range mentioned above of support shaft 23.

D-character cut parts 23a each having an outer circumferential surface (circular tube surface) apart of which is a flat surface are provided in both of the end parts of support shaft 23. Each support plate 35 is provided with spring 24 serving as a bias member. Spring 24 is, for example, a torsion spring, and includes a wound part that is wound around pin 35a provided in support plate 35, and with a pair of arm parts at both ends thereof.

One of the arm parts of spring 24 is in contact with pin 35b provided in support plate 35. The other arm part of spring 24 is in contact with the flat surface in D-character cut part 23a of support shaft 23. With this, spring 24 biases support shaft 23 upward (in other words, toward the side of discharge roller 20). In other words, pinch roller 22 attached to support shaft 23 is brought into pressure contact with discharge roller 20 constantly.

Pinch roller 22 is not fixed to support shaft 23, and can rotate relative to support shaft 23 while generating a slight frictional force therebetween. When discharge roller 20 rotates, pinch roller 22 rotates by following discharge roller 20 due to the frictional force against discharge roller 20 (or due to the frictional force against medium 2 in nip part 29).

Figure 4:
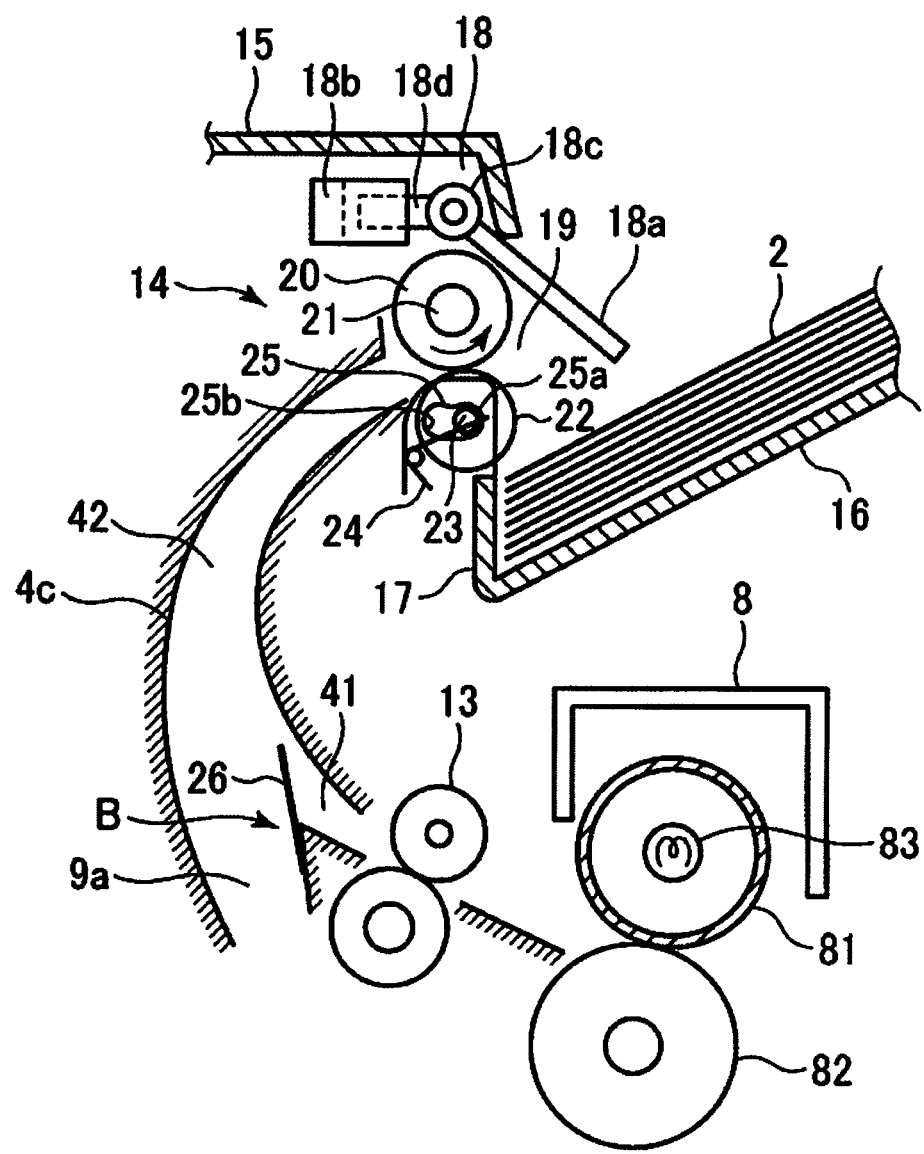
FIG. 4 is a view illustrating a fixation unit, the discharge mechanism, and a stacker in the first embodiment.

FIG. 4 is a view illustrating fixation unit 8, discharge mechanism 15, and stacker 16. When discharge roller 20 is rotating in a direction to allow medium 2 to be discharged (a rotation in the counterclockwise direction in the drawing), pinch roller 22 rotates by following discharge roller 20 and is moved in position in the rotation direction of discharge roller 20, as is described later, and support shaft 23 moves within guide grooves 25. When support shaft 23 comes into contact with outer-side end part 25a of guide groove 25, pinch roller 22 is located at a position (first position) where apart of the outer circumferential surface thereof protrudes from discharge port 19 (wall part 17) to the side of stacker 16.

In contrast, when discharge roller 20 is rotating in the reverse direction (a rotation in the clockwise direction in the drawing), pinch roller 22 rotates by following discharge roller 20 and is moved in position in the rotation direction of discharge roller 20, and support shaft 23 moves within guide grooves 25. When support shaft 23 comes into contact with inner-side end part 25b of guide groove 25, pinch roller 22 is located at a position (second position) where pinch roller 22 is retracted in discharge mechanism 15 from discharge port 19.

Discharge path 4c between discharge roller unit 14 and conveyance roller unit 13 is divided into first conveyance path 41 at the side of conveyance roller unit 13 and second conveyance path 42 at the side of discharge roller unit 14 at branch part B with re-conveyance path 9 as a boundary.

Film 26 (guide member) mentioned above is provided in a portion where first conveyance path 41 in discharge path 4c and introduction portion 9a in re-conveyance path 9 are joined. More specifically, film 26 is fixed to the inner surface of introduction portion 9a in re-conveyance path 9 and protrudes into discharge path 4c. Moreover, film 26 includes, for example, an elastic material such as PET (polyethylene terephthalate), has a thickness of about 0.2 mm, and has flexibility.

An acute angle is made by the extension direction of film 26 and the conveyance direction of medium 2 having passed between the rollers of conveyance roller unit 13. Accordingly, when film 26 comes into contact with medium 2 having passed between the rollers of conveyance roller unit 13, film 26 is biased and deformed by medium 2 (see FIG. 6). In other words, medium 2 having passed between the pair of rollers of conveyance roller unit 13 is conveyed in discharge path 4c while pushing film 26 aside.

<Control System of Printer>

Figure 5:
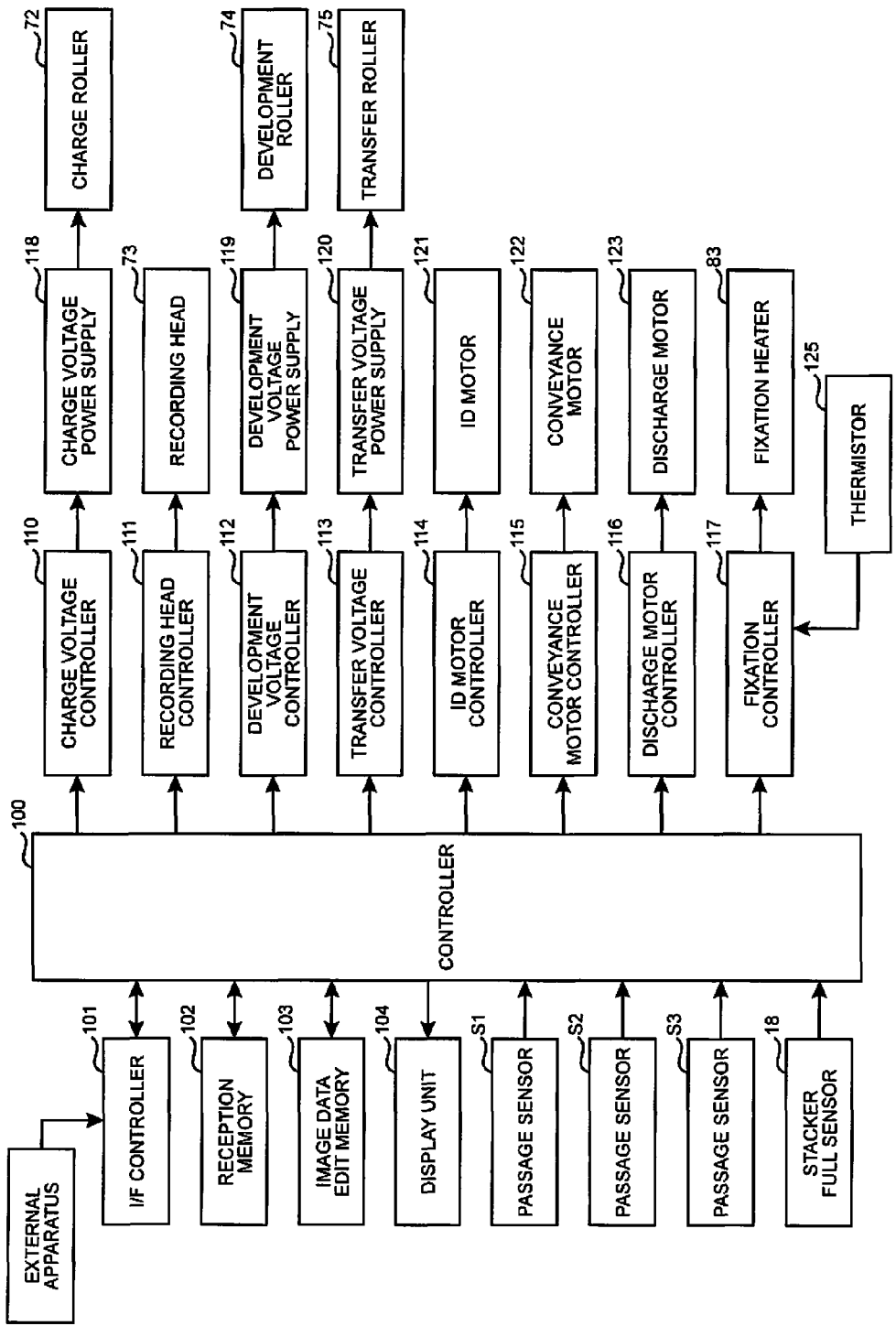
FIG. 5 is a block diagram illustrating a control system of the printer in the first embodiment.

FIG. 5 is a block diagram illustrating a control system of printer 1. Printer 1 includes controller 100 that has a micro processor, a ROM, a RAM, an input/output port, and a timer, or the like. Controller 100 receives printing data and a control command from an external apparatus or a higher-level apparatus, controls overall printer 1, and performs a printing operation.

Printer 1 further includes I/F controller 101, reception memory 102, image data edit memory 103, and display unit 104.

I/F controller 101 analyzes a command inputted from an external apparatus (for example, a personal computer), and processes data. Reception memory 102 stores therein the data inputted from the external apparatus via I/F controller 101. Image data edit memory 103 receives printing data that is inputted from the external apparatus via I/F controller 101 and is temporally stored in reception memory 102, and edits the printing data as image data and stores it therein. Display unit 104 displays on a liquid crystal display unit, for example, information relating to a state of printer 1.

Moreover, output signals from passage sensors S1 to S3 and stacker full sensor 18 mentioned above are inputted to controller 100.

Printer 1 further includes charge voltage controller 110, recording head controller 111, development voltage controller 112, transfer voltage controller 113, ID motor controller 114, conveyance motor controller 115, discharge motor controller 116, and fixation controller 117.

Charge voltage controller 110 controls a charge voltage supplied from charge voltage power supply 118 to charge roller 72. Recording head controller 111 performs such control that recording head 73 is caused to emit light on the basis of image data.

Development voltage controller 112 controls a development voltage supplied from development voltage power supply 119 to development roller 74. Transfer voltage controller 113 controls a transfer voltage supplied from transfer voltage power supply 120 to transfer roller 75.

ID motor controller 114 controls ID motor 121 for rotating photosensitive drum 71 and the like. Note that, among the respective rollers in image formation unit 7, charge roller 72, development roller 74, and transfer roller 75 rotate by following the rotation of photosensitive drum 71.

Conveyance motor controller 115 controls conveyance motor 122 for rotating the respective rollers (of which the rotation direction is constant) that convey medium 2. Conveyance motor 122 rotates pickup roller 31, paper feed roller 32, conveyance roller units 5, 6, fixation roller 81, conveyance roller unit 13, and pairs of re-conveyance rollers 91, 92.

Discharge motor controller 116 controls discharge motor 123 for rotating discharge roller 20 that discharges medium 2, and draws back medium 2 for preparing the duplex printing.

As for the rotation direction of discharge roller 20 (in other words, the rotation direction of discharge motor 123), a normal direction (forward direction) indicates a rotation direction to discharge medium 2, and a reverse direction indicates a rotation direction to switch back medium 2.

Fixation controller 117 heat-controls fixation heater 83 built-in fixation roller 81 on the basis of the surface temperature of fixation roller 81 that is detected by thermistor 125 (temperature detector) provided in fixation unit 8.

<Overall Operation of Printer>

A basic operation of printer 1 is described. Firstly, a single-side printing operation is described. Upon receiving a control command and printing data that are transmitted from an external apparatus via I/F controller 101, controller 100 drives conveyance motor 122 to rotate pickup roller 31 and paper feed roller 32, and to send out media 2 one by one from paper feed cassette 3A to supply conveyance path 4a. In addition, controller 100 rotates drive rollers of conveyance roller units 5 and 6 to convey medium 2 to image formation unit 7.

Moreover, controller 100 drives ID motor 121 to rotate photosensitive drum 71 and development roller 74. With the rotation, charge roller 72 and transfer roller 75 rotate by following the rotation of photosensitive drum 71.

A charge voltage is applied to charge roller 72 to uniformly charge the surface of photosensitive drum 71. Recording head 73 is driven at a timing when passage sensor S2 detects the leading end of medium 2, and emits light on the surface of photosensitive drum 71 to form an electrostatic latent image. A development voltage is applied to development roller 74 to develop the electrostatic latent image on the surface of photosensitive drum 71 with toner. Moreover, at a timing when medium 2 reaches a nip part between photosensitive drum 71 and transfer roller 75, a transfer voltage is applied to transfer roller 75 to transfer a toner image on the surface of photosensitive drum 71 onto medium 2.

Medium 2 onto which the toner image is transferred in the image formation unit 7 is conveyed to fixation unit 8 with the rotation of transfer roller 75. In fixation unit 8, fixation roller 81 and pressurization roller 82 fix the toner image to medium 2 by heating and pressurization. Medium 2 having the fixed toner image thereon is discharged from fixation unit 8 with the rotation of fixation roller 81, and reaches conveyance roller unit 13.

The pair of rollers of conveyance roller unit 13 that are already rotating conveys medium 2 that is discharged from fixation unit 8 toward discharge path 4c. Medium 2 conveyed by conveyance roller unit 13 travels by pushing aside film 26 (FIG. 4), and is conveyed in discharge path 4c.

The rollers of discharge roller unit 14 start to rotat by discharge motor controller 116 at a timing when passage sensor S3 detects the leading end of medium 2. Discharge roller unit 14 discharges medium 2 conveyed from conveyance roller unit 13, through discharge port 19. Medium 2 discharged through discharge port 19 is stacked on stacker 16. With this, the single-side printing operation is completed.

Meanwhile, in the case of a duplex printing operation, at a timing when the trailing end of medium 2 passes by film 26 (FIG. 4), discharge motor controller 116 reverses the rotation direction of discharge motor 123, so that discharge roller unit 14 rotates in the reverse direction. Note that, the timing when discharge roller unit 14 starts the rotation in the reverse direction is determined by, for example, counting the elapsed time from a time point when passage sensor S3 detects the trailing end of medium 2. At the time point when discharge roller unit 14 start the rotation in the reverse direction, the leading end of medium 2 protrudes externally from discharge port 19.

When discharge roller unit 14 starts the rotation in the reverse direction, medium 2 is switched back in discharge path 4c to come into contact with film 26 that extends into discharge path 4c, and is sent into introduction portion 9a in re-conveyance path 9.

After medium 2 is sent into re-conveyance path 9, the leading end of medium 2 reaches the pair of re-conveyance rollers 91 before the trailing end of medium 2 passes between discharge roller unit 14. The pair of re-conveyance rollers 91, 92 that are already put in rotation by conveyance motor 122 conveys medium 2 along re-conveyance path 9.

Further, medium 2 being conveyed in re-conveyance path 9 reaches conveyance roller unit 6 in a state where front and back sides thereof are reversed. Conveyance roller unit 6 conveys medium 2 to image formation unit 7. Image formation unit 7 forms a toner image on photosensitive drum 71, and transfers the toner image onto the back side of medium 2 as in the manner mentioned above.

Thereafter, fixation unit 8 fixes the toner image to medium 2, and conveyance roller unit 13 conveys medium 2 along discharge path 4c. Drive roller 20 of conveyance roller unit 14 starts to rotate in the normal direction at a timing when passage sensor S3 detects the leading end of medium 2, and discharges medium 2 conveyed from conveyance roller unit 13, through discharge port 19. Medium 2 discharged through discharge port 19 is stacked on stacker 16. With this, the duplex printing operation is completed.

<Operation of Discharge Mechanism>

Figure 6:
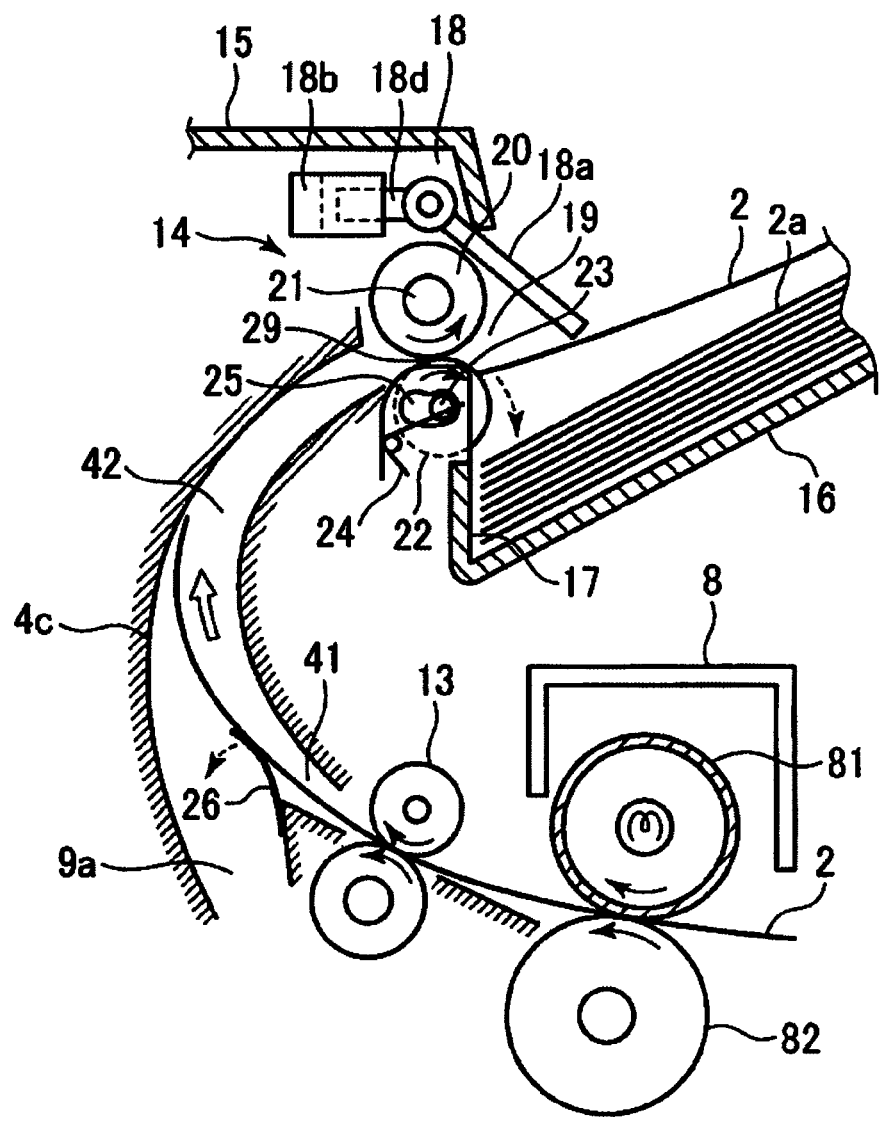
FIG. 6 is a schematic view for explaining a discharge operation of a medium in the printer in the first embodiment.

Next, the operation of discharge mechanism 15 in the embodiment is described. FIG. 6 is a view illustrating a state where medium 2 is discharged from discharge mechanism 15, and is stacked on stacker 16. As mentioned above, medium 2 to which the toner image is fixed by fixation unit 8 is conveyed by conveyance roller unit 13, travels in discharge path 4c by pushing aside film 26, and reaches discharge roller unit 14.

When medium 2 is discharged, discharge roller 20 in the discharge roller unit 14 rotates in the normal direction (the rotation being in the counterclockwise direction in the drawing) driven by discharge motor 123 mentioned above. Pinch roller 22 rotates by following the rotation of discharge roller 20 because pinch roller 22 is brought into pressure contact with discharge roller 20 due to the biasing force of spring 24. Moreover, pinch roller 22 is moved in position in the rotation direction of discharge roller 20 (the movement direction of the outer circumferential surface of discharge roller 20) because a slight friction is generated between pinch roller 22 and support shaft 23. At this time, support shaft 23 moves within guide grooves 25.

Support shaft 23 comes into contact with outer-side end part 25a of guide groove 25 to stop the positional movement of pinch roller 22. At this time, pinch roller 22 is located at the position (first position) where a part of the outer circumferential surface thereof protrudes from discharge port 19 (wall part 17) to stacker 16, and is rotatably supported around support shaft 23.

Further, even if pinch roller 22 rotates, the arm part of spring 24 is in contact with the flat surface in D-character cut part 23a of support shaft 23 to prevent support shaft 23 from rotating.

With the rotation of discharge roller 20, medium 2 is sent out in the tangential direction of discharge roller 20 in nip part 29. Medium 2 is discharged with the leading end of medium 2 being hung down by the force of gravity such that the leading end is touching with the upper surface of media 2a already stacked on stacker 16.

Further, when the trailing end of medium 2 passes through nip part 29 between discharge roller unit 14, the trailing end of medium 2 falls along the outer circumference of pinch roller 22 with the rotation of pinch roller 22. Medium 2 that is fallen is stacked on media 2a stacked on stacker 16. Moreover, medium 2 is stacked while being slid toward the side of wall part 17 because of the slanted bottom surface of stacker 16 mentioned above. In other words, wall part 17 regulates a position of the trailing end of medium 2. Accordingly, multiple media 2 in a state where the trailing ends thereof are aligned (thus, in a state where the leading ends thereof are also aligned) are stacked on stacker 16.

The height of wall part 17 is higher than the rotation center of pinch roller 22, and slightly lower than the height of nip part 29 between discharge roller 20 and pinch roller 22. The reason for this is not to prevent medium 2 having passed through nip part 29 from being discharged, but to prevent media 2a stacked on stacker 16 from being drawn in by discharge mechanism 15 when the duplex printing is performed.

Figure 7:
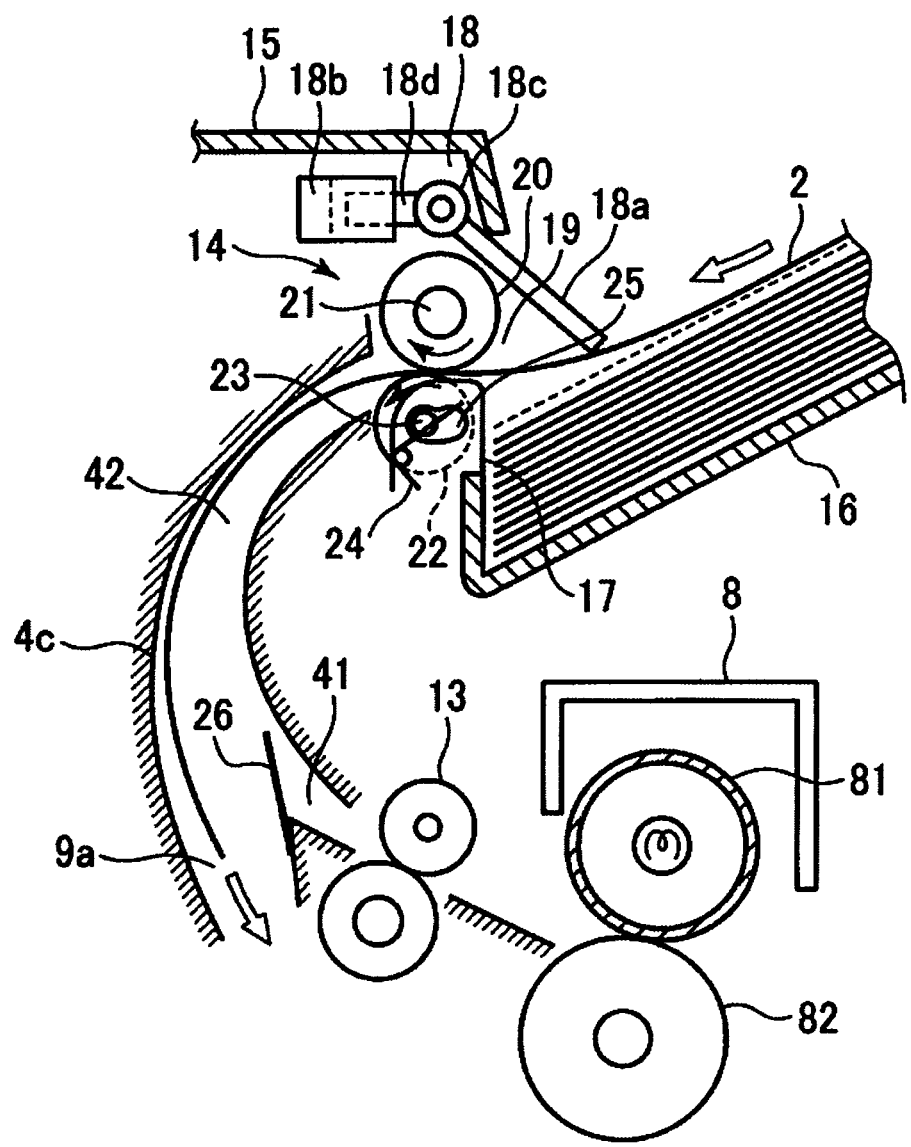
FIG. 7 is a schematic view for explaining a draw-back operation of the medium in the printer in the first embodiment.

FIG. 7 is a view illustrating the state where discharge roller 20 rotates in the reverse direction to draw back medium 2 for the duplex printing. As mentioned above, when the duplex printing is performed, discharge roller 20 starts the rotation in the reverse direction in the case where the leading end of medium 2 is discharged through discharge port 19, and the trailing end of medium 2 is located at the side of discharge roller unit 14 from film 26 in discharge path 4c (second conveyance path 42).

When discharge roller 20 starts the rotation in the reverse direction, medium 2 is conveyed in a direction (switchback direction) reversed to the discharge direction. Pinch roller 22 rotates by following the movement of medium 2 and is moved in position in the rotation direction of discharge roller 20, and support shaft 23 moves within guide groove 25.

Support shaft 23 comes into contact with inner-side end part 25b of guide groove 25 to stop the positional movement of pinch roller 22. At this time, pinch roller 22 is located at the position (second position) where the outer circumferential surface thereof is retracted to the inner side of discharge mechanism 15 from discharge port 19 (wall part 17).

In other words, when medium 2 is switched back, pinch roller 22 is rotatably supported at a position retracted to the inner side of discharge mechanism 15 from wall part 17. Because pinch roller 22 is located at the retracted position in this manner, even if the height of media 2a stacked on stacker 16 reaches the height of pinch roller 22, medium 2a is out of contact with pinch roller 22.

Medium 2 switched back by the reverse rotation of pinch roller 22 travels downward second conveyance path 42 in discharge path 4c. When medium 2 is in contact with film 26 that extends so as to almost block first conveyance path 41 in discharge path 4c, medium 2 is guided by film 26 to re-conveyance path 9. Accordingly, even if the leading end part of medium 2 is curled to the first conveyance path 41 side, medium 2 is reliably sent into re-conveyance path 9.

Figure 8:
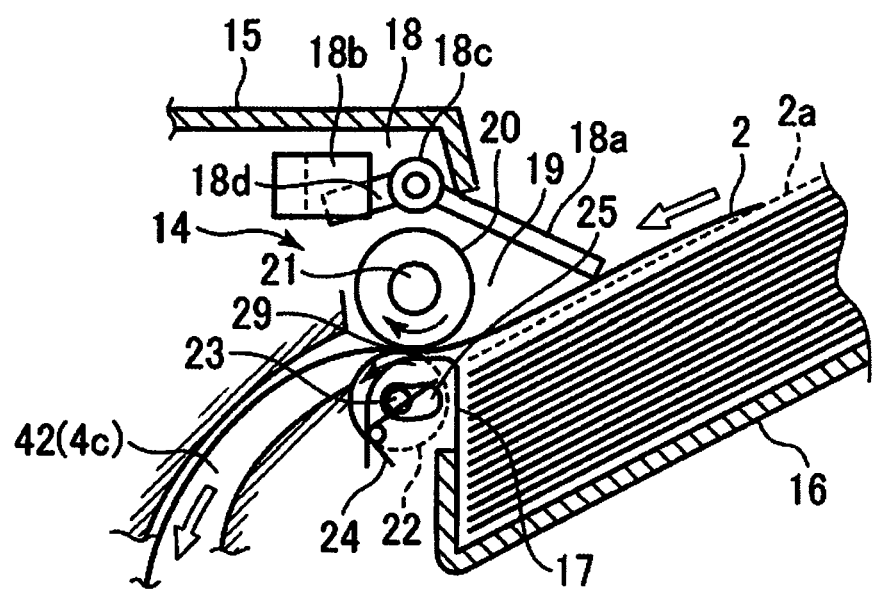
FIG. 8 is a schematic view for explaining the draw-back operation when the height of the media stacked on the stacker is high, in the printer in the first embodiment.

FIG. 8 is a view illustrating the state where the height of media 2a stacked on stacker 16 reaches the vicinity of nip part 29 between discharge roller unit 14. Medium 2 to be switched back for the duplex printing and medium 2a at the top most of media 2a stacked on stacker 16 are in contact with each other in wide areas. Accordingly, medium 2a is required not to be drawn into discharge mechanism 15 together with medium 2 due to the friction between paper sheets, the static electricity, or the like.

In the embodiment, the height of wall part 17 reaches the vicinity of nip part 29. Accordingly, even when the height of media 2a stacked on stacker 16 reaches the vicinity of nip part 29 between discharge roller unit 14, media 2a stacked on stacker 16 are prevented from being drawn into discharge mechanism 15.

Meanwhile, when the height of media 2a stacked on stacker 16 exceeds the height of wall part 17, it is impossible to prevent media 2a from being drawn into discharge mechanism 15 by means of wall part 17. Therefore, in the embodiment, a stacker full sensor 18 is provided that detects when the height of media 2a stacked on stacker 16 reaches a predetermined height.

Stacker full sensor 18 includes lever unit 18a that can swing around support shaft 18c provided in the upper portion of discharge mechanism 15. Lever unit 18a extends from support shaft 18c through discharge port 19 to the side of stacker 16. The tip of lever unit 18a is located at a position in contact with top medium 2a of media 2a stacked on stacker 16 when the height of media 2a reaches the predetermined height.

Sensor unit (detector) 18b that detects an angle of lever unit 18a is disposed in discharge mechanism 15. Sensor unit 18b is herein disposed adjacent to support shaft 18c on a side opposite from medium 2 in the discharge direction (left side in the drawing). Sensor unit 18b includes a light emission element and a light reception element that are opposed to each other. Lever unit 18a integrally includes detected unit 18d that extends toward sensor unit 18b.

When lever unit 18a is out of contact with media 2a stacked on stacker 16, detected unit 18d is positioned between the light emission element and the light reception element in sensor unit 18b. Accordingly, the amount of received light of the light reception element in sensor unit 18b is 0, and the signal output from sensor unit 18b becomes OFF.

In contrast, when lever unit 18a comes into contact with media 2a stacked on stacker 16, lever unit 18a swings around support shaft 18c, and as illustrated in FIG. 8, detected unit 18d comes out from a portion between the light emission element and the light reception element in sensor unit 18b. With this, light emitted from the light emission element in sensor unit 18b enters the light reception element, and the signal output from sensor unit 18b becomes ON.

Herein, as illustrated in FIG. 8, when the height of the trailing ends of media 2a stacked on stacker 16 exceeds the height of wall part 17, lever unit 18a is configured to come into contact with medium 2a and swing so that detected unit 18d comes out from the light path of sensor unit 18b.

Controller 100 (FIG. 5) in printer 1 does not accept a new printing job when the output from sensor unit 18b is ON. In other words, when the height of the trailing ends of media 2a stacked on stacker 16 reaches the height of wall part 17, printing on a new medium is not performed, and the height of media 2a to be stacked on stacker 16 is limited. This can prevent media 2a stacked on stacker 16 to be drawn into discharge mechanism 15 when the duplex printing is performed, and can prevent the media from becoming jammed.

Alternatively, controller 100 may be configured not to accept a new printing job and to display a message that "please remove paper sheets on the stacker", or the like, on display unit 104, when the height of the trailing ends of media 2a stacked on stacker 16 reaches the height of wall part 17.

Further, lever unit 18a may be disposed at a position where lever unit 18a can come into contact with medium 2a when the height of media 2a stacked on stacker 16 reaches the predetermined height. For example, lever unit 18a may be disposed at the center part in the width direction of media 2a, or at an end part in the width direction of media 2a.

Moreover, a stopper that restricts the swing range of lever unit 18a to a certain range may be provided. In particular, it is preferable to provide a stopper that specifies the lower limit of the swing range of lever unit 18a such that lever unit 18a is out of contact with discharge roller 20 or rotation drive shaft 21.

Comparative Example

Figure 9:
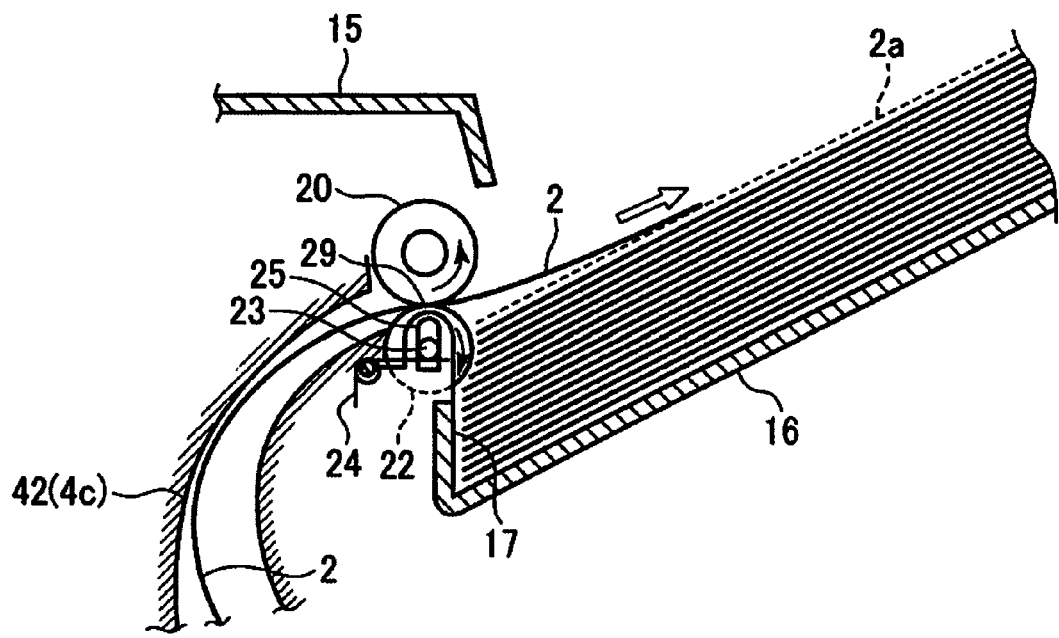
FIG. 9 is a schematic view for explaining a discharge operation of a medium in a printer in a comparative example.
Figure 10:
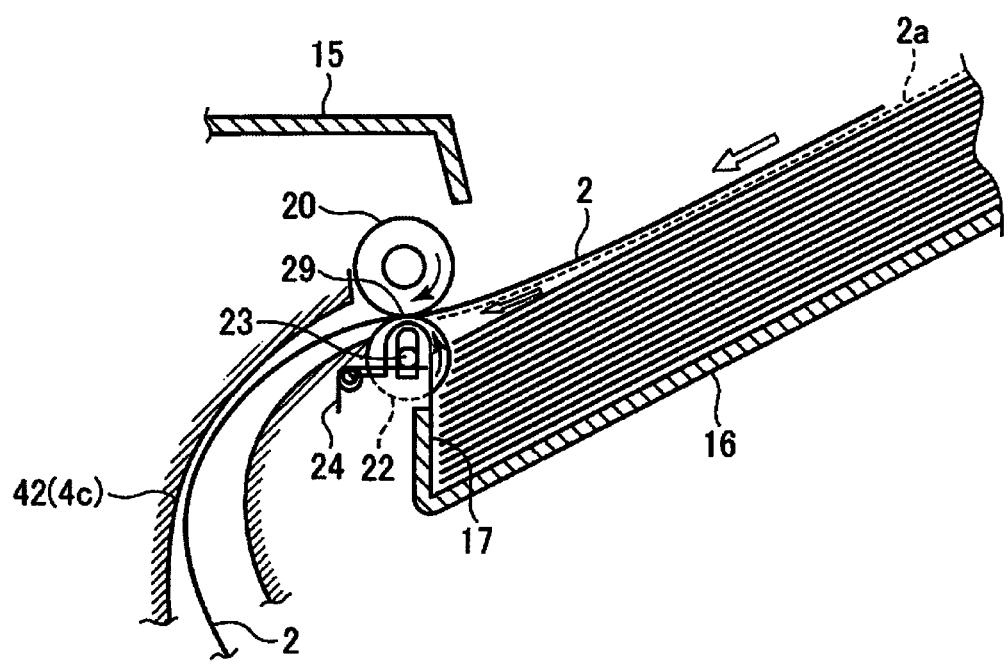
FIG. 10 is a schematic view for explaining the draw-back operation of the medium in the printer in the comparative example.

Next, a comparative example with respect to the embodiment is described. FIG. 9 is a view illustrating a state where discharge mechanism 15 in the comparative example discharges medium 2. FIG. 10 is a view illustrating a state where discharge roller 20 draws back medium 2 for performing duplex printing. Note that, for convenience in explaining, the components in the comparative example illustrated in FIG. 9 and FIG. 10 are denoted with similar reference numerals as used in the first embodiment.

In the comparative example, pinch roller 22 is not moved in position in the tangential direction of discharge roller 20 in a nip part. In other words, support shaft 23 that rotatably supports pinch roller 22 is supported so as to be movable only in the vertical direction (direction in which discharge roller 20 and pinch roller 22 are opposed to each other), and is brought into pressure contact with discharge roller 20 by spring 24. Further, the outer circumferential surface of pinch roller 22 constantly protrudes to the side of stacker 16 from wall part 17. Other configurations are similar to that of discharge mechanism 15 in the first embodiment.

As illustrated in FIG. 9, when medium 2 is discharged, discharge roller 20 rotates in the normal direction (the rotation being in the counterclockwise direction in the drawing). Pinch roller 22 is brought into pressure contact with discharge roller 20, and rotates by following discharge roller 20. Medium 2 passes through nip part 29 between discharge roller 20 and pinch roller 22, and is stacked on stacker 16.

Meanwhile, as illustrated in FIG. 10, when discharge roller 20 rotates in the reverse direction for the duplex printing, medium 2 having discharged halfway from discharge port 19 is conveyed in a direction (switchback direction) reversed to the discharge direction. Pinch roller 22 rotates by following the movement of medium 2.

In the comparative example, pinch roller 22 is not retracted to the inner side of discharge mechanism 15. Accordingly, even when medium 2 is switched back, the outer circumferential surface of pinch roller 22 protrudes to the side of stacker 16 from wall part 17.

This leads media 2a to be in contact with the outer circumferential surface of pinch roller 22 when the height of media 2a stacked on stacker 16 is increased. If pinch roller 22 starts the rotation in the reverse direction in this state, there is a possibility that media 2a stacked on stacker 16 are drawn into nip part 29.

In particular, when the height of media 2a stacked on stacker 16 exceeds the height of the rotation center of pinch roller 22, as illustrated in FIG. 10 by a dashed line, media 2a stacked on stacker 16 are likely to be drawn into nip part 29 with the rotation of pinch roller 22. As a result, media 2a stacked on stacker 16 are also conveyed together with medium 2 on which the duplex printing is performed. This causes the media to be jammed.

In contrast, in the first embodiment of the invention, as is described with reference to FIG. 7, when discharge roller 20 rotates in the reverse direction for the duplex printing, pinch roller 22 is retracted to the inner side from wall part 17 and is out of contact with media 2a stacked on stacker 16. Accordingly, even if the height of media 2a stacked on stacker 16 is increased (in particular, when it exceeds the height of the rotation center of pinch roller 22), the media 2a are not drawn into nip part 29. As a result, it is possible to prevent the media from being jammed.

Effect of First Embodiment

As described above, with the first embodiment of the invention, when discharge roller 20 rotates in the reverse direction with respect to the direction along which medium 2 is discharged, pinch roller 22 is retracted to the inner side of wall part 17. This prevents pinch roller 22 from being in contact with media 2a stacked on stacker 16. Thus, it is possible to prevent media 2a stacked on stacker 16 from being drawn into nip part 29, and prevent the media from being jammed.

Moreover, pinch roller 22 is moved in position by using the rotation of discharge roller 20. Thus, a dedicated drive source for moving pinch roller 22 is unnecessary. Thus, it is possible to prevent the media from being jammed with the simple apparatus configurations.

In addition, when the height of the trailing ends of media 2a stacked on stacker 16 reaches the predetermined height (in particular, the height exceeding the height of wall part 17), controller 100 is configured not to accept a new printing job. Thus, it is possible to prevent the media from being jammed caused by media 2a stacked on stacker 16 climbing over (or above) wall part 17. As a result, it is possible to stack a greater number of media on stacker 16.

Moreover, stacker full sensor 18 that detects the height of media 2a stacked on stacker 16 is provided. Thus, it is possible to accurately determine whether the height of media 2a stacked on stacker 16 exceeds the predetermined height on the basis of the output from stacker full sensor 18.

Second Embodiment

Next, a second embodiment of the invention is described. The configuration of a printer and a discharge mechanism thereof in the second embodiment of the invention is similar to that of printer 1 and discharge mechanism 15 in the first embodiment, except for the configuration of pinch roller 22. Hereinafter, a difference from the first embodiment is described.

Figure 11A:
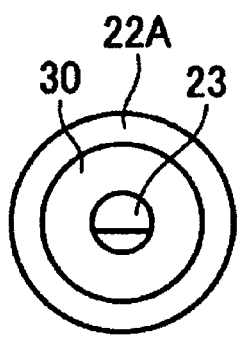
FIG. 11A is a side view illustrating a configuration of a pinch roller according to a second embodiment of the invention.
Figure 11B:
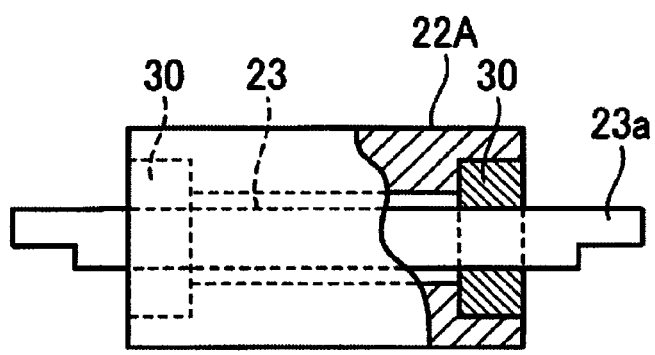
FIG. 11B is a partial cross-sectional view thereof.

FIGS. 11A and 11B are a side view and a partial cross-sectional view, respectively, illustrating a configuration of pinch roller 22A in the second embodiment. Pinch roller 22 mentioned above in the first embodiment is attached to support shaft 23 so as to generate a slight frictional force therebetween with support shaft 23. In contrast, pinch roller 22A in the second embodiment is attached to support shaft 23 via one-way bearings 30.

More specifically, a clearance between the inner circumferential surface of pinch roller 22A and the outer circumferential surface of support shaft 23 is formed. One-way bearings 30 are respectively provided at both end parts in the shaft direction of pinch roller 22A, and support shaft 23 that is a metal shaft penetrates through two one-way bearings 30.

Each one-way bearing 30 freely rotates only in one direction (clockwise direction illustrated in FIG. 11A) with respect to support shaft 23. In contrast, each one-way bearing rotates in the opposite direction (counterclockwise direction illustrated in FIG. 11A) together with support shaft 23. Pinch roller 22A is fixed to the outer circumferences of one-way bearings 30.

Accordingly, when discharge roller 20 rotates in a direction (normal direction) to discharge medium 2, pinch roller 22A is rotated by the rotation of discharge roller 20. In contrast, discharge roller 20 rotates in a direction (reverse direction) to draw back medium 2 for the duplex printing, and pinch roller 22A does not rotate.

Figure 12:
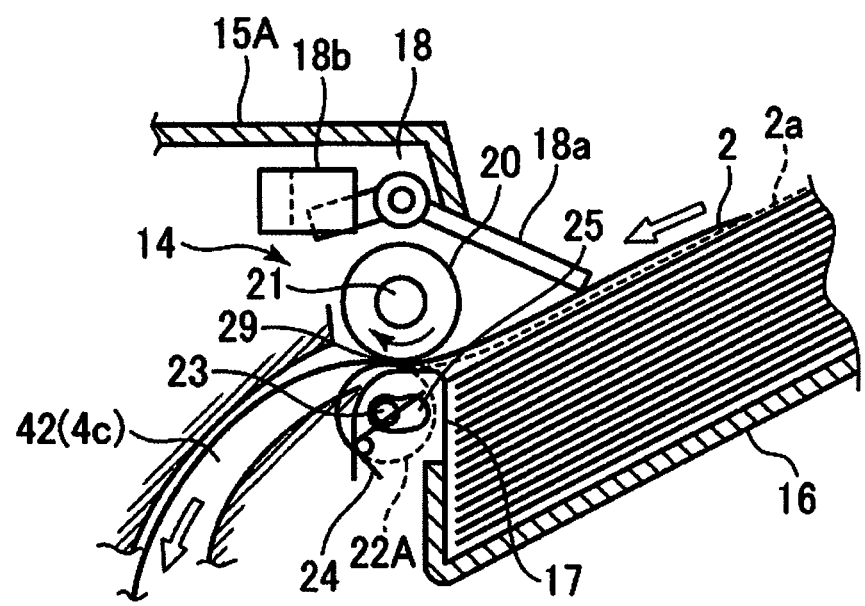
FIG. 12 is a schematic view for explaining a draw-back operation of a medium in a printer in the second embodiment.

An operation of discharge mechanism 15A in the second embodiment is described with reference to FIG. 12. FIG. 12 is a view illustrating an operation of discharge roller unit 14 (discharge roller 20 and pinch roller 22A) in discharge mechanism 15A in the second embodiment.

When medium 2 is discharged through discharge port 19, as is described in the first embodiment, discharge roller 20 rotates in the normal direction due to the rotation transmission from discharge motor 123 to rotation shaft 21. Pinch roller 22A is brought into pressure contact with discharge roller 20 due to the biasing force of spring 24, and one-way bearings 30 are freely rotatable in the discharge direction with respect to support shaft 23. Thus, pinch roller 22A rotates by following discharge roller 20.

Moreover, a slight frictional force is generated between one-way bearings 30 and support shaft 23. Thus, pinch roller 22A is moved in position in the rotation direction of discharge roller 20 (the movement direction on the outer circumferential surface), and support shaft 23 moves within guide grooves 25. Support shaft 23 comes into contact with outer-side end part 25a of guide groove 25 to stop the positional movement of pinch roller 22A. At this time, pinch roller 22A is located at the position (first position) where a part of the outer circumferential surface thereof protrudes from discharge port 19 to the side of stacker 16, and is rotatably supported around support shaft 23. Medium 2 passes through nip part 29 and is sent out with the rotation of discharge roller 20.

When discharge roller 20 rotates in the reverse direction for the duplex printing, medium 2 is conveyed in a direction reversed to the discharge direction (in other words, is switched back). In the embodiment, pinch roller 22A does not rotate in the direction reversed to the rotation direction when the medium is discharged by the action of one-way bearings 30. Pinch roller 22A is moved in position in the rotation direction of discharge roller 20 (movement direction on the outer circumferential surface) by the friction with the medium 2 to be switched back, and support shaft 23 moves within guide grooves 25.

Support shaft 23 comes into contact with inner-side end part 25b of guide groove 25 to stop the positional movement of pinch roller 22A. At this time, pinch roller 22A is located at the position (second position) where the outer circumferential surface thereof is retracted to the inner side of discharge mechanism 15 from wall part 17. In other words, pinch roller 22A stops the rotation thereof at a position retracted to the inner side of discharge mechanism 15 from wall part 17.

Even if the rotation of pinch roller 22A is stopped, the frictional force between discharge roller 20 and medium 2 is sufficiently larger than the frictional force between pinch roller 22A and medium 2. Thus, medium 2 is switched back by the reverse rotation of discharge roller 20.

An operation in which medium 2 is switched back by the reverse rotation of discharge roller 20 and is sent into re-conveyance path 9 is the same as that described with reference to FIG. 7 in the first embodiment.

Moreover, when the height of media 2a stacked on stacker 16 reaches a predetermined height, stacker full sensor 18 detects the fact, and controller 100 does not accept a new printing job. This operation is the same as that described with reference to FIG. 8 in the first embodiment.

Also in the embodiment, when medium 2 is switched back in the duplex printing, pinch roller 22A is located at the retracted position. Thus, even when the height of media 2a stacked on stacker 16 reaches the height of pinch roller 22A, media 2a are out of contact with pinch roller 22A. Thus, it is possible to prevent media 2a stacked on stacker 16 from being drawn into nip part 29, and prevent the media from being jammed.

FIG. 12 a view illustrating a state where media 2a stacked on stacker 16 climb over or above wall part 17 due to some causes and are in contact with pinch roller 22A. In the embodiment, when medium 2 is switched back for the duplex printing, pinch roller 22A stops the rotation thereof. Accordingly, even if media 2a stacked on stacker 16 exceed the height of wall part 17 by some causes and are in contact with pinch roller 22A, media 2a are not drawn into nip part 29 (because pinch roller 22A stops the rotation thereof).

As described above, with the second embodiment of the invention, when discharge roller 20 rotates in the reverse direction to draw back medium 2, pinch roller 22A is moved to the inner side of wall part 17. Thus, even when the height of media 2a stacked on stacker 16 is increased, it is possible to prevent media 2a stacked on stacker 16 from being drawn into nip art 29, and prevent the media from being jammed.

In addition, in the second embodiment of the invention, pinch roller 22A does not rotate when discharge roller 20 rotates in the reverse direction. Thus, even if media 2a stacked on stacker 16 climb over wall part 17 and are in contact with pinch roller 22A, medium 2a is not drawn into nip part 29.

Although explanations are made with respect to printer 1 serving as an image formation apparatus having a duplex printing function in the first and the second embodiments mentioned above, the function is not limited to the duplex printing function. An image formation apparatus that performs printing on one side multiple times, for example, may be used as long as the image formation apparatus has the function of using a medium that can be being discharged and switched back.

Moreover, the first and the second embodiments mentioned above can be applied to various types of image processors, such as a scanner (image reading apparatus) that reads the front and back sides of a document serving as a medium, and are not limited to the image formation apparatus that performs printing on a medium. In other words, the first and the second embodiments mentioned above can be applied to a medium processing apparatus having a configuration in which a document is discharged and switched back.

Moreover, although the explanations are made with respect to a printer as an example of image formation apparatuses, the invention can be also utilized in multi function peripherals (MFPs), facsimiles, or copiers.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A medium processing apparatus comprising:
   a discharge mechanism including a drive roller configured to be rotatable in a normal direction to discharge a medium and in a reverse direction reversed to the normal direction, and a driven roller biased to come into pressure contact with the drive roller, and configured to be rotated by the rotation of the drive roller; and
   a stacker on which the medium discharged from the discharge mechanism is to be stacked, wherein
   the driven roller is disposed below the drive roller,
   the driven roller is supported to be movable in a rotation direction of the drive roller depending on the rotation of the drive roller in the normal direction or the reverse direction,
   the driven roller is located at a first position in vicinity of the stacker when the drive roller is rotating in the normal direction, and
   the driven roller is located at a second position further away from the stacker than the first position when the drive roller is rotating in the reverse direction.

2. The medium processing apparatus according to claim 1, wherein
   the stacker includes a wall part that is a boundary between the discharge mechanism and the stacker, and
   the driven roller protrudes to the stacker from the wall part at the first position, and is retracted into the discharge mechanism from the wall part at the second position.

3. The medium processing apparatus according to claim 1, wherein a height of the wall part is higher than a rotation center of the driven roller, and is lower than a nip part between the drive roller and the driven roller.

4. The medium processing apparatus according to claim 1, further comprising:
   a support shaft configured to rotatably support the driven roller; and
   a guide unit configured to restrict a movement range of the support shaft.

5. The medium processing apparatus according to claim 4, wherein the guide unit limits both end positions of the movable range of the support shaft in a tangential direction of the drive roller to the driven roller in a nip part between the drive roller and the driven roller.

6. The medium processing apparatus according to claim 4, further comprising a bias member configured to bias the driven roller in a direction to bring the driven roller into pressure contact with the drive roller, wherein
   the support shaft includes a flat surface at a portion of the support shaft that is in contact with the bias member.

7. The medium processing apparatus according to claim 1, wherein
   the driven roller is configured to rotate by following the drive roller when the drive roller rotates in the normal direction, and not to rotate when the drive roller rotates in the reverse direction.

8. The medium processing apparatus according to claim 7, wherein the driven roller is attached to the support shaft via a one-way bearing.

9. The medium processing apparatus according to claim 1, further comprising a stack detector configured to detect a height of media stacked on the stacker.

10. The medium processing apparatus according to claim 1, further comprising
    a controller configured to control processing on a medium, wherein
    the controller performs a control not to accept a new job when a stack detector detects that a height of media stacked on a stacker reaches a predetermined height.

11. The medium processing apparatus according to claim 1, wherein the drive roller is supported to be movable in a discharge direction in which the medium is discharged to the stacker from the inside of the image processing apparatus and in a withdrawn direction in which the medium is withdrawn from the stacker to the inside of the image processing apparatus
    wherein the driven roller is located at the first position where the driven roller has been moved in the discharge direction toward the stacker, when the drive roller is rotating in the normal direction to discharge the medium, and wherein the driven roller is located at the second position where the driven roller has been moved in the withdrawn direction away from the stacker, when the drive roller is rotating in the reverse direction to withdraw the medium.

12. The medium processing apparatus according to claim 1, wherein the driven roller is movable in an arc-shaped trajectory with respect to the drive roller.

13. The medium processing apparatus according to claim 12, further comprising a support shaft supporting the driven roller; and a guide formed in the arc shaped trajectory to guide movement of the shaft, wherein the support shaft of the driven roller is movable along the guide so that the driven roller is movable in the arc shaped trajectory with respect to the drive roller.

14. An image formation apparatus, comprising:

an image formation unit configure to form an image on a medium;

a discharge mechanism configured to discharge the medium having the formed image thereon; and a stacker on which the medium discharged from the discharge mechanism is to be stacked, wherein the discharge mechanism includes:

a drive roller configured to be rotatable in a normal direction to discharge the medium, and in a reverse direction reversed to the normal direction; and a driven roller biased to come into pressure contact with the drive roller, and configured to be rotated by the rotation of the drive roller, the driven roller is disposed below the drive roller, the driven roller is supported to be movable in a rotation direction of the drive roller depending on the rotation of the drive roller in the normal direction or in the reverse direction, the driven roller is located at a first position in vicinity of the stacker when the drive roller is rotating in the normal direction, and the driven roller is located at a second position further away from the stacker than the first position when the drive roller is rotating in the reverse direction.

15. The medium processing apparatus according to claim 14, wherein the drive roller is supported to be movable in a discharge direction in which the medium is discharged to the stacker from the inside of the image processing apparatus and in a withdrawn direction in which the medium is withdrawn from the stacker to the inside of the image processing apparatus wherein the driven roller is located at the first position where the driven roller has been moved in the discharge direction toward the stacker, when the drive roller is rotating in the normal direction to discharge the medium, and wherein the driven roller is located at the second position where the driven roller has been moved in the withdrawn direction away from the stacker, when the drive roller is rotating in the reverse direction to withdraw the medium.

16. The medium processing apparatus according to claim 14, wherein the drive roller is supported to be movable in a discharge direction in which the medium is discharged to the stacker from the inside of the image processing apparatus and in a withdrawn direction in which the medium is withdrawn from the stacker to the inside of the image processing apparatus wherein the driven roller is located at the first position where the driven roller has been moved in the discharge direction toward the stacker, when the drive roller is rotating in the normal direction to discharge the medium, and wherein the driven roller is located at the second position where the driven roller has been moved in the withdrawn direction away from the stacker, when the drive roller is rotating in the reverse direction to withdraw the medium.

17. A medium discharge mechanism, comprising:

a discharge mechanism including a drive roller configured to be rotatable in a normal direction to discharge a medium, and in a reverse direction reversed to the normal direction, and a driven roller biased to come into pressure contact with the drive roller, and configured to be rotated by the rotation of the drive roller; and a stacker on which the medium discharged from the discharge mechanism is to be stacked, wherein the driven roller is disposed below the drive roller, the driven roller is supported to be movable in a rotation direction of the drive roller depending on the rotation of the drive roller in the normal direction or the reverse direction, the driven roller is located at a first position in vicinity of the stacker when the drive roller is rotating in the normal direction, and the driven roller is located at a second position further away from the stacker than the first position when the drive roller is rotating in the reverse direction.

* * * * *